(12) United States Patent
Utsugi

(10) Patent No.: US 8,559,762 B2
(45) Date of Patent: Oct. 15, 2013

(54) IMAGE PROCESSING METHOD AND APPARATUS FOR INTERPOLATING DEFECTIVE PIXELS

(75) Inventor: Akihiko Utsugi, Tokyo (JP)

(73) Assignee: Nikon Corporation, Tokyo (JP)

( * ) Notice: Subject to any disclaimer, the term of this patent is extended or adjusted under 35 U.S.C. 154(b) by 1233 days.

(21) Appl. No.: 12/318,125

(22) Filed: Dec. 22, 2008

(65) Prior Publication Data

US 2009/0175553 A1 Jul. 9, 2009

(30) Foreign Application Priority Data

Dec. 28, 2007 (JP) ................................ 2007-339351
Dec. 9, 2008 (JP) ................................ 2008-313480

(51) Int. Cl.
*G06K 9/36* (2006.01)

(52) U.S. Cl.
USPC ........................................................ 382/300

(58) Field of Classification Search
None
See application file for complete search history.

(56) References Cited

U.S. PATENT DOCUMENTS

| | | | |
|---|---|---|---|
| 6,081,917 A | 6/2000 | Yasui et al. | |
| 6,507,364 B1 * | 1/2003 | Bishay et al. | 348/242 |
| 6,642,960 B1 | 11/2003 | Kohashi et al. | |
| 2002/0158977 A1 | 10/2002 | Hamilton, Jr. | |
| 2006/0050990 A1 | 3/2006 | Yamanaka et al. | |
| 2006/0132626 A1 * | 6/2006 | Sakurai | 348/246 |

FOREIGN PATENT DOCUMENTS

| | | |
|---|---|---|
| EP | 0 687 106 A1 | 12/1995 |
| JP | A-09-284783 | 10/1997 |
| JP | A-11-220661 | 8/1999 |
| JP | A-2000-308082 | 11/2000 |
| JP | A-2005-175547 | 6/2005 |
| JP | A-2005-223815 | 8/2005 |
| JP | B2-3951992 | 5/2007 |

OTHER PUBLICATIONS

European Search Report issued in European Patent Application No. EP 08172741.4, dated Aug. 13, 2010.
Dec. 18, 2012 Office Action issued in Japanese Patent Application No. 2008-313480 w/translation.

* cited by examiner

*Primary Examiner* — Brian P Werner
(74) *Attorney, Agent, or Firm* — Oliff & Berridge, PLC

(57) ABSTRACT

An image processing apparatus includes: a storage unit that records position information for a defective pixel; a setting unit that sets the defective pixel as an interpolation subject pixel, on the basis of the recorded position information; a selection unit that selects an optimum calculation equation for interpolated value from among a plurality of calculation equations for interpolated value in order to interpolate the pixel value of the interpolation subject pixel; and an interpolation unit that interpolates the pixel value of the interpolation subject pixel by using the optimum calculation equation for interpolated value selected by the selection unit; wherein the optimum calculation equation for interpolated value is one of the calculation equations for interpolated value that can be applied to the interpolation subject pixel, and has the highest interpolation accuracy of the calculation equations for interpolated value.

9 Claims, 3 Drawing Sheets

EXAMPLE OF DEFECT MAP D(i, j)

| 0 | 0 | 0 | 0 |
|---|---|---|---|
| 0 | 1 | 1 | 0 |
| 0 | 1 | 1 | 1 |
| 0 | 0 | 0 | 0 |

IMAGE PROCESSING METHOD AND APPARATUS FOR INTERPOLATING DEFECTIVE PIXELS

INCORPORATION BY REFERENCE

The disclosures of the following priority applications are herein incorporated by reference:
Japanese Patent Application No. 2007-339351 filed Dec. 28, 2007; and
Japanese Patent Application No. 2008-313480 filed Dec. 9, 2008.

BACKGROUND OF THE INVENTION

1. Field of the Invention

The present invention relates to an image processing apparatus and to an imaging apparatus.

2. Description of Related Art

In Japanese Laid-Open Patent Publication 2005-223815, an image processing apparatus is disclosed that interpolates a defective pixel clump in image data. In Japanese Patent 3,951,992 there is disclosed an image processing apparatus that performs defect correction by detecting an unevenness structure in other color components and adding interpolated values.

SUMMARY OF THE INVENTION

Generally, a color component that is missing from a Bayer image is calculated as follows. That is, first, the average value is calculated using the pixel values of the same color as a subject color component among the pixels around a subject location. And the unevenness structure at the subject location is extracted using pixel values of a different color or the like as the subject color component, and this extracted value is added to the average value. Due to this, the accuracy is enhanced by recreating the fine structure and by suppressing false color. However, with a prior art image processing apparatus, when correcting a defective clump of an arbitrary shape, the uneven-nesses of the other color components are not added to the interpolated values. Accordingly, the accuracy with which the fine structure is recreated and the false color is suppressed is not sufficient.

According to the 1st aspect of the present invention, an image processing apparatus comprises: a storage unit that records position information for a defective pixel; a setting unit that sets the defective pixel as an interpolation subject pixel, on the basis of the recorded position information; a selection unit that selects an optimum calculation equation for interpolated value from among a plurality of calculation equations for interpolated value in order to interpolate the pixel value of the interpolation subject pixel; and an interpolation unit that interpolates the pixel value of the interpolation subject pixel by using the optimum calculation equation for interpolated value selected by the selection unit; wherein the optimum calculation equation for interpolated value is one of the calculation equations for interpolated value that can be applied to the interpolation subject pixel, and has the highest interpolation accuracy of the calculation equations for interpolated value.

According to the 2nd aspect of the present invention, in the image processing apparatus according to the 1st aspect, it is preferred that the calculation equations for interpolated value use pixel values of a plurality of reference pixels for interpolation that are arranged around the interpolation subject pixel; and each of the plurality of calculation equations for interpolated value has a mutually different combination of pixel values of the plurality of reference pixels for interpolation that are used, and has mutually different interpolation accuracies; and the selection unit: decides that each one of the calculation equations for interpolated value can be applied to the interpolation subject pixel, if the plurality of reference pixels for interpolation used by the calculation equation for interpolated value do not include any defective pixel except for the interpolation subject pixel; and selects the calculation equation for interpolated value of which interpolation accuracy is the highest among the calculation equations for interpolated value decided as being applicable, as the optimum calculation equation for interpolated value.

According to the 3rd aspect of the present invention, in the image processing apparatus according to the 1st aspect, it is preferred that the calculation equation for interpolated value includes a reference calculation equation for interpolated value and an auxiliary calculation equation for interpolated value; the selection unit, after having selected an optimum reference calculation equation for interpolated value from among a plurality of the reference calculation equations for interpolated value, selects an optimum auxiliary calculation equation for interpolated value from among a plurality of the auxiliary calculation equations for interpolated value corresponding to the optimum reference calculation equation for interpolated value that has been selected; the interpolation unit performs interpolation so that a value obtained by adding together a reference interpolated value and an auxiliary interpolated value becomes the pixel value for the interpolation subject pixel, the reference interpolated value being calculated by using the optimum reference calculation equation for interpolated value and the auxiliary interpolated value being calculated by using the optimum auxiliary calculation equation for interpolated value; the optimum reference calculation equation for interpolated value is one of the reference calculation equations for interpolated value that can be applied to the interpolation subject pixel, and has the highest interpolation accuracy of the reference calculation equations for interpolated value; and the optimum auxiliary calculation equation for interpolated value is one of the auxiliary calculation equations for interpolated value that can be applied to the interpolation subject pixel, and has the highest interpolation accuracy of the auxiliary calculation equations for interpolated value.

According to the 4th aspect of the present invention, in the image processing apparatus according to the 2nd aspect, it is preferred that the selection unit: calculates a position of the reference pixel for interpolation in an image data, on the basis of a position of the interpolation subject pixel in the image data and a relative position information of the reference pixel for interpolation with respect to the interpolation subject pixel; decides whether or not the reference pixel for interpolation is a defective pixel, on the basis of the position of the reference pixel for interpolation in the image data and a position information of the defective pixel; and decides that the calculation equation for interpolated value can be applied to the interpolation subject pixel, if the reference pixel for interpolation is decided as not being a defective pixel.

According to the 5th aspect of the present invention, in the image processing apparatus according to the 1st aspect, it is preferred that the selection unit: decides whether or not each of the calculation equations for interpolated value can be applied to the interpolation subject pixel, in descending order of interpolation accuracy; and selects the calculation equation for interpolated value that is first decided as being applicable, as the optimum calculation equation for interpolated value.

According to the 6th aspect of the present invention, in the image processing apparatus according to the 3rd aspect, it is preferred that the selection unit: decides whether or not each of the reference calculation equations for interpolated value can be applied to the interpolation subject pixel, in descending order of interpolation accuracy; and selects the reference calculation equation for interpolated value that is first decided as being applicable, as the optimum reference calculation equation for interpolated value.

According to the 7th aspect of the present invention, in the image processing apparatus according to the 3rd aspect, it is preferred that the selection unit: decides whether or not each of the auxiliary calculation equations for interpolated value can be applied to the interpolation subject pixel, in descending order of interpolation accuracy; and selects the auxiliary calculation equation for interpolated value that is first decided as being applicable, as the optimum auxiliary calculation equation for interpolated value.

According to the 8th aspect of the present invention, it is preferred that the image processing apparatus according to the 1st aspect further comprises: a similarity direction decision unit that decides upon a similarity direction of an image structure in a neighborhood of the interpolation subject pixel; and wherein: the selection unit selects the optimum calculation equations for interpolated value from among the plurality of calculation equations for interpolated value, according to the similarity direction that has been decided upon by the similarity direction decision unit.

According to the 9th aspect of the present invention, An image processing apparatus comprises: a storage unit that records a position information of a plurality of defective pixels; and an interpolation unit that: selects a first calculation equation for interpolated value that can be applied to the defective pixel from among a plurality of calculation equations for interpolated value in order to interpolate a pixel value of the defective pixel, by using normal pixels that have a same color as the defective pixel does among the pixels in a neighborhood of the defective pixels of the same color as that of the defective pixel; selects a second calculation equation for interpolated value that can be applied to the defective pixel from among a plurality of calculation equations for interpolated value in order to interpolate the pixel value of the defective pixel, by using normal pixels that have different colors from the defective pixel does among the pixels in the neighborhood of the defective pixel; and interpolates the pixel value of the defective pixel, using the position information for the defective pixel, the first calculation equation for interpolated value, and the second calculation equation for interpolated value.

According to the 10th aspect of the present invention, in the image processing apparatus according to the 9th aspect, it is preferred that the interpolation unit: if there are a plurality of calculation equations for interpolated value that can be applied to the defective pixel among the plurality of calculation equations for interpolated value in order to interpolate the pixel value of the defective pixel by using normal pixels that have the same color as the defective pixel does, selects the calculation equation for interpolated value of which interpolation accuracy is the highest of the calculation equations for interpolated value that can be applied to the defective pixel, as the first calculation equation for interpolated value; and if there are a plurality of calculation equations for interpolated value that can be applied to the defective pixel among the plurality of calculation equations for interpolated value in order to interpolate the pixel value of the defective pixel by using normal pixels that have different colors from the defective pixel does, the calculation equation for interpolated value of which interpolation accuracy is the highest of the calculation equations for interpolated value that can be applied to the defective pixel, as the second calculation equation for interpolated value.

According to the 11th aspect of the present invention, in the image processing apparatus according to the 9th aspect, it is preferred that the interpolation unit decides upon a similarity direction of an image structure in the neighborhood of the defective pixel, and selects the first calculation equation for interpolated value and the second calculation equation for interpolated value from among the plurality of calculation equations for interpolated value, according to the decided similarity direction.

According to the 12th aspect of the present invention, an imaging apparatus comprises: an image sensor that captures an image of a photographic subject; and an image processing apparatus according to the 1st aspect, that creates image data by performing image processing upon an image signal output from the image sensor; wherein: the image processing apparatus creates the image data by interpolating the pixel value of a defective pixel included in the image sensor by using the image signal that is output from the image sensor.

DESCRIPTION OF THE PREFERRED EMBODIMENTS

Embodiment One

Figure 1:
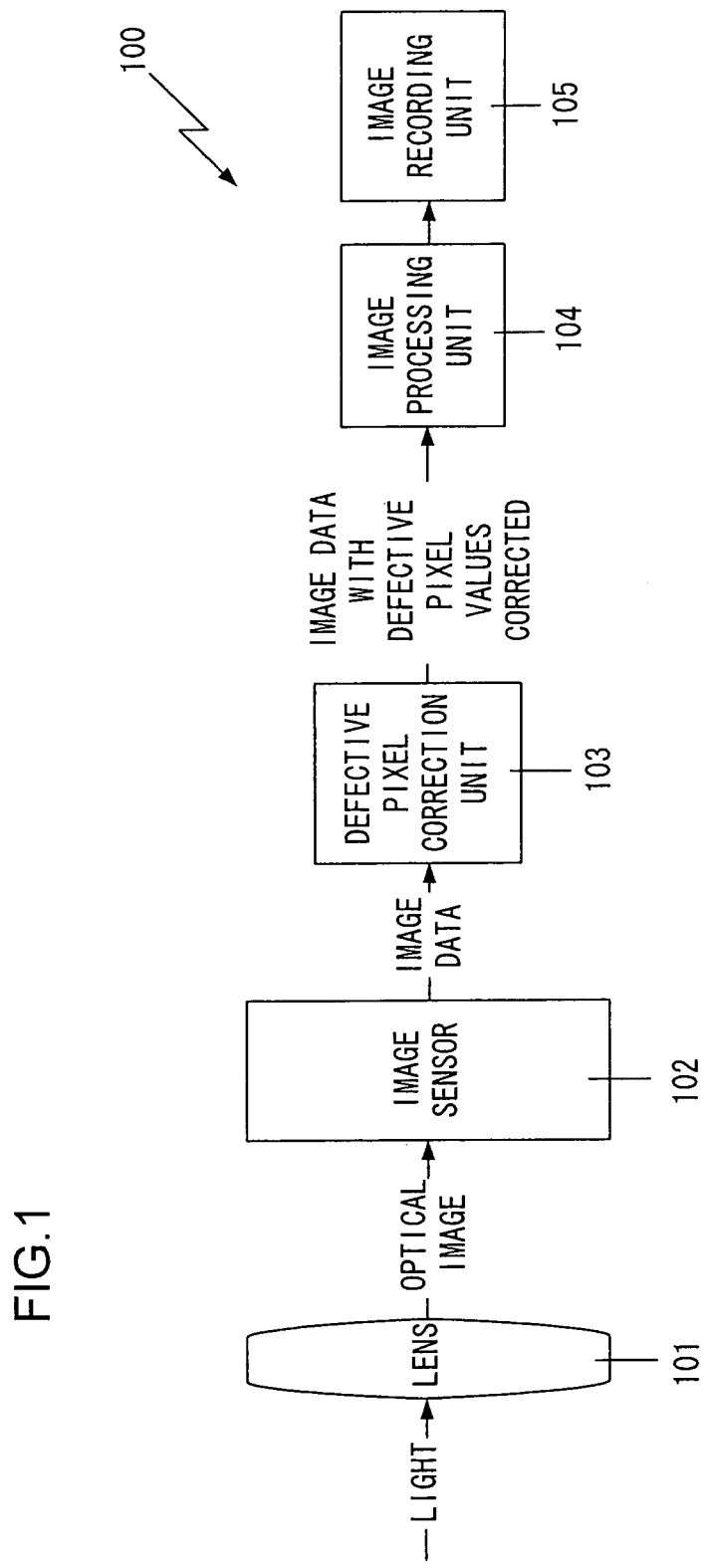
FIG. 1 is a block diagram showing the structure of an embodiment of a digital camera.

FIG. 1 is a block diagram showing the structure of an embodiment of a digital camera. This digital camera 100 includes a lens 101, an image sensor 102, a defective pixel correction unit 103, an image processing unit 104, and an image recording unit 105.

The lens 101 consists of a plurality of optical lenses, and images an image of the photographic subject upon the image sensor 102. The image sensor 102 is, for example, a CCD or CMOS sensor. This image sensor 102 is exposed for a fixed time period, and thereby the optical image is obtained as image data. The image sensor 102 outputs the acquired image data to a defective pixel correction unit 103. At this time, if the image sensor 102 has a clump pixel defect, defective pixels will be present in the image data that has been acquired by the image sensor 102. The defective pixel correction unit 103 performs processing that will be described hereinafter, and corrects the defective pixels in the image data captured by this image sensor 102 that has this type of clump pixel defect. The defective pixel correction unit 103 outputs the image data after correction to an image processing unit 104.

It should be understood that, in this embodiment, the image data that is input from the image sensor 102 is image data in a Bayer array. Moreover, it will be supposed that the defective pixels in this image data are of arbitrary shapes within a size of 4×4 pixels. In this embodiment, it will be supposed that the position of each pixel in the image data is specified by coordinate values in a coordinate system that is established with respect to the image data. In this coordinate system, the horizontal direction of the image data will be taken as the X axis and its vertical direction as the Y axis, and the upper left corner of the image data will be taken as the origin.

After having performed per se known image processing upon the data that has been input such as white balance processing, color interpolation processing, edge enhancement processing, side enhancement processing, and the like, the image processing unit 104 outputs the image data after this image processing to an image recording unit 105. For example, this image recording unit 105 records the image data upon an external storage medium such as a memory card or the like, or upon an internal storage medium such as a flash memory or the like. It should be understood that the defective pixel correction unit 103, the image processing unit 104, and the image recording unit 105 are constituted by a CPU and peripheral circuitry thereof.

Figure 2:
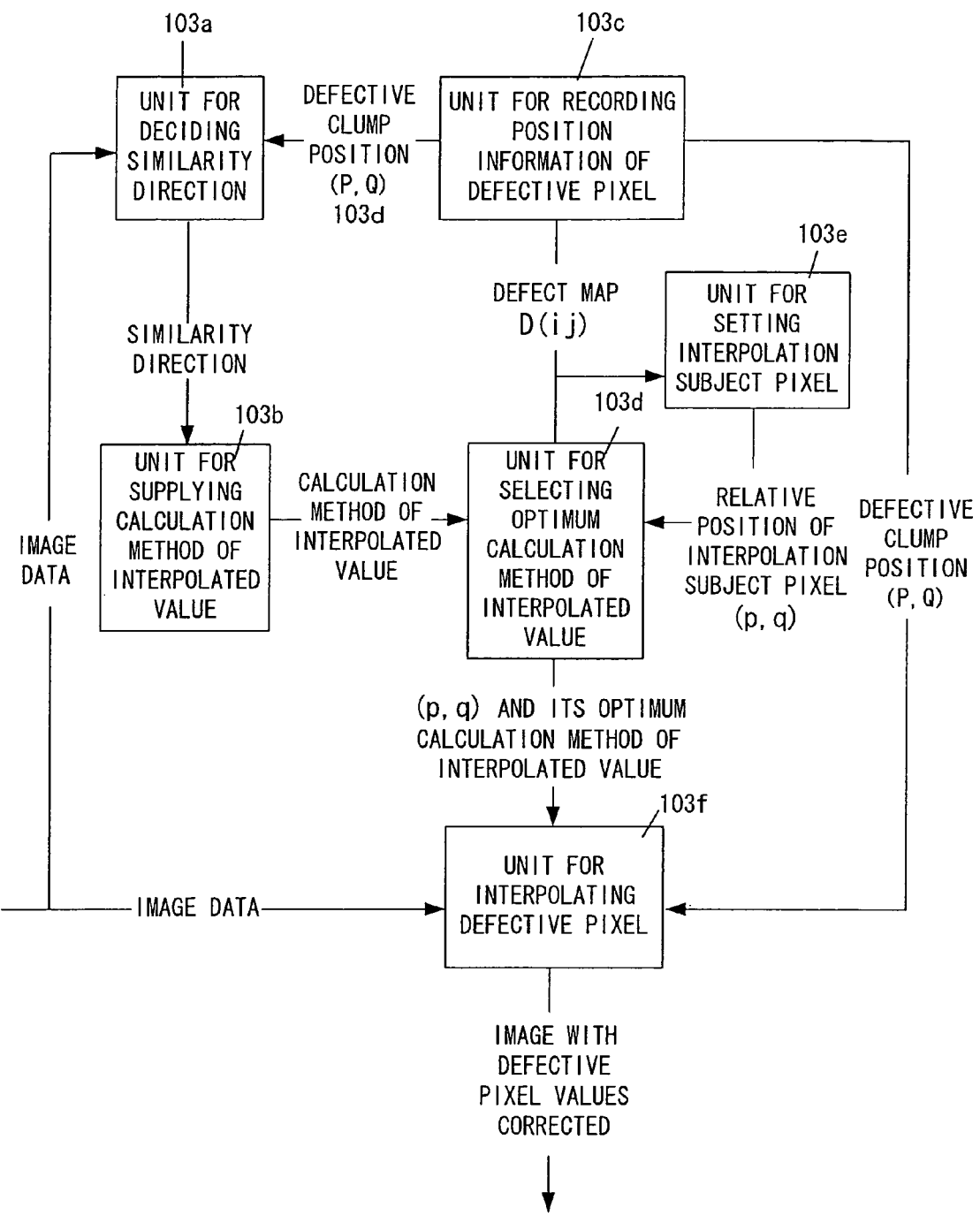
FIG. 2 is a block diagram showing the structure of a defective pixel correction unit 103.

FIG. 2 is a block diagram showing the structure of the defective pixel correction unit 103. In the following, the processing that is executed by this defective pixel correction unit 103 will be explained using this FIG. 2. The defective pixel correction unit 103 includes an unit 103a for deciding similarity direction, an unit 103b for supplying calculation method of interpolated value, an unit 103c for recording position information of defective pixel, an unit 103d for selecting optimum calculation method of interpolated value, an unit 103e for setting interpolation subject pixel, and an unit 103f for interpolating defective pixel. It should be understood that the unit 103c for recording position information of defective pixel is a memory, for example a flash memory, for recording information (hereinafter termed the "defective pixel position information") for specifying the positions and distribution of defective pixels in the image data, as will be described hereinafter. It should be understood that the unit 103a for deciding similarity direction, the unit 103d for selecting optimum calculation method of interpolated value, the unit 103e for setting interpolation subject pixel, and the unit 103f for interpolating defective pixel are constituted by a calculation processing unit.

As defective pixel position information, a defective clump position (P,Q) and a defect map D(i,j) (where i=0~3, j=0~3) are recorded in the unit 103c for recording position information of defective pixel. The defective clump position (P,Q) is the coordinate values of the upper left corner of a 4×4 pixel defective clump region within the image. And the defect map D(i,j) (where i=0~3, j=0~3) is map information for specifying whether or not each of the pixels in this defective clump region is defective. It should be understood that the defective clump position (P,Q) and the defect map (D(i,j) (where i=0~3, j=0~3) are generated on the basis of the results of investigating the defective pixel characteristics of the image sensor, before shipment of this digital camera.

Figure 3:
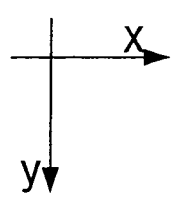
FIG. 3 is a figure showing a concrete example of a defect map D(i,j).

As shown in FIG. 3, in this defect map D(i,j), the normal pixels and the defective pixels are distinguished by the respective code values 0 and 1. In other words, if the pixel (P+i,Q+j) in the image data is a normal pixel, D(i,j)=0 in the defect map D(i,j); while, if the pixel (P+i,Q+j) in the image data is a defective pixel, D(i,j)=1 in the defect map D(i,j). It should be understood that here the term "normal pixel" includes a pixel that previously manifested an anomaly such as output decrease or the like, but of which output has been corrected to a normal output value by performing previous correction processing such as gain correction or the like, not shown in the figures. Although, in the following explanation, an example will be explained in which correction is performed for a single pixel clump, it should be understood that it is also possible to perform this correction for a plurality of defective pixel clumps by repeating the same processing for each clump.

First, the image data that is output from the image sensor 102 is input to the unit 103a for deciding similarity direction. The unit 103a for deciding similarity direction reads in the above described defective clump position (P,Q) from the unit 103c for recording position information of defective pixel. Then the unit 103a for deciding similarity direction calculates the CV, the CH, the C45, and the C135 for the region of which distance is within four pixels from the defective clump region (in other words, for the 12×12 region that is centered upon the 4×4 defect region, excluding the 4×4 region in its center). The CV, CH, C45, and C135 are the sums of the absolute values of the differences in value between adjacent pixels of the same color (i.e. the sums of the absolute values of the adjacent pixel differences). Here, CV is the sum of the absolute values of the differences in value for adjacent pixels in the vertical direction (i.e., the sum of the absolute values of the differences), while CH is the sum of the absolute values of the differences in value for adjacent pixels in the horizontal direction. Moreover, C45 is the sum of the absolute values of the differences in value for adjacent pixels in the direction that slopes at 45°, while C135 is the sum of the absolute values of the differences in value for adjacent pixels in the direction that slopes at 135°. And the unit 103a for deciding similarity direction decides that the direction in which the differential absolute value sum is the smallest among these four directions is the similarity direction.

According to the similarity direction that has been decided upon by the unit 103a for deciding similarity direction, the unit 103b for supplying calculation method of interpolated value outputs a plurality of calculation methods of interpolated value to the unit 103d for selecting optimum calculation method of interpolated value. Calculation methods of interpolated value are set in advance and recorded in the memory for each of the possible similarity directions, i.e. horizontally, vertically, sloping at 45°, and sloping at 135°. The unit 103b for supplying calculation method of interpolated value selects, from among these, the calculation methods of interpolated value for the direction that corresponds to the result of the decision by the unit 103a for deciding similarity direction. And the unit 103b for supplying calculation method of interpolated value outputs these calculation methods of interpolated value that have been selected to the unit 103d for selecting optimum calculation method of interpolated value.

By way of example, it will be supposed that the decision result regarding similarity direction by the unit 103a for deciding similarity direction has been the horizontal direction. At this time, as the plurality of calculation methods of interpolated value referring to pixels in the horizontal direction, the unit 103b for supplying calculation method of interpolated value outputs the following eight calculation methods of interpolated value (calculation equations for interpolated value), from a calculation method #1 of interpolated value to a calculation method #8 of interpolated value, to the unit 103d for selecting calculation method of interpolated value:

Calculation method #1 of interpolated value: n=6, X={−2, 2, −3, −1, 1, 3}, Y={0, 0, 0, 0, 0, 0}, K={2, 2, −1, 1, 1, −1}.

Calculation method #2 of interpolated value: n=4, X={−2, 2, −3, −1}, Y={0, 0, 0, 0}, K={2, 2, −1, 1}.

Calculation method #3 of interpolated value: n=4, X={−2, 2, 1, 3}, Y={0, 0, 0, 0}, K={2, 2, 1, −1}.

Calculation method #4 of interpolated value: n=2, X={−2, 2}, Y={0, 0}, K={2, 2}.

Calculation method #5 of interpolated value: n=3, X={−2, −3, −1}, Y={0, 0, 0}, K={4, −2, 2}.

Calculation method #6 of interpolated value: n=3, X={2, 1, 3}, Y={0, 0, 0}, K={4, 2, −2}.

Calculation method #7 of interpolated value: n=1, X={−2}, Y={0}, K={4}.

Calculation method #8 of interpolated value: n=1, X={2}, Y={0}, K={4}.

It should be understood that, in the above described calculation method #1 of interpolated value, the term "X={−2, 2, −3, −1, 1, 3}" means that the values in an array X are as follows:
X[0]=−2
X[1]=2
X[2]=−3
X[3]=−1
X[4]=1
X[5]=3

Moreover, each of these calculation methods of interpolated value is output as a structural element having the parameters n, X, Y, and K.

The above described integer n and arrays X, Y, and K are parameters that specify the interpolation method; and the processing for calculating the pixel value A(x,y) at the coordinates (x,y) is performed according to the following Equation (1):

Equation #1

$$A(x, y) = \frac{1}{4}\sum_{i=0}^{n-1}(K[i] \times A(x+X[i], y+Y[i])) \quad (1)$$

For example, the interpolation equation for the calculation method #1 of interpolated value becomes the following Equation (2):

Equation #2

$$A(x, y) = \frac{1}{2}(A(x-2, y) + A(x+2, y)) + \frac{1}{4}(-A(x-3, y) + A(x-1, y) + A(x+1, y) - A(x+3, y)) \quad (2)$$

Here, the first term in the interpolation equation given as Equation (2) calculates an interpolated value that is to become a reference by obtaining the average of the pixel values for pixels of the same color on the left and right of (x,y). And the second term extracts the minute unevenness structure using the pixels of different colors on the left and right of (x,y). And, in the interpolation equation of Equation (2), the ability of reproduction of the fine structure is enhanced by adding the minute unevenness structure that has been extracted to the interpolated value that is the reference.

And the interpolation equation for the calculation method #2 of interpolated value becomes the following Equation (3):

Equation #3

$$A(x, y) = \frac{1}{2}(A(x-2, y) + A(x+2, y)) + \frac{1}{4}(-A(x-3, y) + A(x-1, y)) \quad (3)$$

With this interpolation equation shown in Equation (3), the interpolation accuracy is somewhat inferior as compared to the calculation method #1 of interpolated value, since the second term that extracts the unevenness structure is imperfect.

Moreover, the interpolation equation for the calculation method #5 of interpolated value becomes the following Equation (4):

Equation #4

$$A(x, y) = A(x-2, y) + \frac{1}{4}(-A(x-3, y) + A(x-1, y)) \quad (4)$$

With this interpolation equation shown in Equation (4), the interpolation accuracy is inferior as compared to the calculation methods #1 and #2 of interpolated value, since only the pixel on the left side of (x,y) are referred to in the calculation of the interpolation value that becomes the reference. Thus, these calculation methods of interpolated value are ranked in the descending order of their interpolation accuracy. In other words, while each of these calculation methods of interpolated value uses a different combination of the plurality of pixel values that are referred to, they also provide different accuracies of interpolation.

The unit 103e of setting interpolation subject pixel reads in the defect map D(i,j) (where i=0~3 and j=0~3) from the unit 103c for recording position information of defective pixel, and specifies the pixel positions (p,q) (i.e. the relative positions of the interpolation subject pixels) of the pixels that satisfy D(p,q)=1 in the defect map D(i,j). For example, in the shown in FIG. 3, the unit 103e for setting interpolation subject pixel specifies (1,1), (1,2), (2,1) (2,2), and (3,2) as being the relative positions of the interpolation subject pixel. And the unit 103e for setting interpolation subject pixel outputs the defect map D(i,j) and the relative positions (p,q) of the interpolation subject pixels to the unit 103d for selecting optimum calculation method of interpolated value.

The unit 103d for selecting optimum calculation method of interpolated value acquires the calculation methods #1 through #8 of interpolated value that have been input from the unit 103b for supplying calculation method of interpolated value, and the defect map D(i,j) and the relative positions (p,q) of the interpolation subject pixels that have been input from the unit 103e for setting interpolation subject pixel. And while referring to the defect map D(i,j), the unit 103d for selecting optimum calculation method of interpolated value makes decisions as to whether it is possible to apply any of the calculation methods #1 through #8 of interpolated value to the relative positions (p,q) of the interpolation subject pixels. At this time, the unit 103d for selecting optimum calculation method of interpolated value performs these decisions in order from the calculation method #1 of interpolated value.

If the pixels referred to by the calculation method of interpolated value are all normal, the unit 103d for selecting optimum calculation method of interpolated value decides that it is possible to apply this calculation method of interpolated value. In concrete terms, the unit 103d for selecting optimum calculation method of interpolated value sets the values to 0 when i and j are negative or greater than or equal to 4 in the defect map D(i,j). At this time, if the following Equation (5) is valid, the unit 103d for selecting optimum calculation method of interpolated value decides that this calculation method of interpolated value can be applied:

Equation #5

$$\sum_{i=0}^{n-1} D(p + X[i], q + Y[i]) = 0 \qquad (5)$$

Equation #6

$$A(P + p, Q + q) = \frac{1}{4}\sum_{i=0}^{n-1}(K[i] \times A(P + p + X[i], Q + q + Y[i])) \qquad (7)$$

The unit 103d for selecting optimum calculation method of interpolated value selects the first calculation method of interpolated value for which the result of making the decision described above is applicable, as the optimum calculation method of interpolated value. For example, with the defect map D(i,j) shown in FIG. 3: for (p,q)=(1,1), the calculation method #2 of interpolated value is selected as the optimum calculation method of interpolated value; while, for (p,q)=(1, 2), the calculation method #3 of interpolated value is selected as the optimum calculation method of interpolated value. Moreover, for (p,q)=(2,1), the calculation method #5 of interpolated value is selected as the optimum calculation method of interpolated value; for (p,q)=(2,2), the calculation method #4 of interpolated value is selected as the optimum calculation method of interpolated value; and for (p,q)=(3,2), the calculation method #6 of interpolated value is selected as the optimum calculation method of interpolated value.

As described above, the calculation methods of interpolated value are arranged from #1 in order of decreasing interpolation accuracy, so that the unit 103d for selecting optimum calculation method of interpolated value selects the optimum calculation method of interpolated value by deciding for each calculation method of interpolated value, in order from the calculation method #1 of interpolated value downwards, whether or not it can be applied. As a result, it is possible to select the calculation method of interpolated value for which the interpolation accuracy is the highest among the calculation methods of interpolated value that actually can be applied, as the optimum calculation method of interpolated value. It should be understood that, if the width of the defective pixel clump is less than or equal to 4 pixels, since at least one of the calculation methods #7 and #8 interpolated value will be determined to be applicable, it is certain that one of the calculation methods interpolated value will be selected by the unit 103d for selecting optimum calculation method of interpolated value.

The unit 103d for selecting optimum calculation method of interpolated value outputs the relative positions (p,q) of the interpolation subject pixels, and the optimum calculation methods of interpolated value for interpolating at these relative positions (p,q) of the interpolation subject pixels, to the unit 103f for interpolating defective pixel.

The unit 103f for interpolating defective pixel acquires the relative positions (p,q) of the interpolation subject pixels that are input from the unit 103d for selecting optimum calculation method of interpolated value and the corresponding optimum calculation methods of interpolated value for performing interpolation at these positions. And the unit 103f for interpolating defective pixel reads in the above described defective clump positions (P,Q) from the unit 103c for recording position information of defective pixel. Then the unit 103f for interpolating defective pixel generates an interpolated defective pixel A(P+p,Q+q) at each of the relative positions (p,q) of the interpolation subject pixels, by using the parameters n, X, Y, and K of the optimum calculation method of interpolated value, according to the following Equation (6):

By doing this, the unit 103f for interpolating defective pixel is able to generate an interpolated defective pixel A(P+p,Q+q) in the image data, by using the optimum interpolated values that have been calculated by using the optimum calculation method of interpolated value selected by the unit 103d for selecting optimum calculation method of interpolated value.

According to the first embodiment as explained above, the following beneficial operational effects may be obtained.

(1) It is arranged to record the position information of defective pixel for the image sensor in the unit 103c for recording position information of defective pixel. It is arranged for the unit 103b for supplying calculation method of interpolated value to supply a plurality of calculation methods of interpolated value for generating the interpolated pixel values at the defective pixels to the unit 103d for selecting optimum calculation method of interpolated value, and for the unit 103e for setting interpolation subject pixel to set the defective pixels as the interpolation subject pixels. Moreover, it is arranged for the unit 103d for selecting optimum calculation method of interpolated value to select, as the optimum calculation method of interpolated value, a calculation method of interpolated value that can be applied to the interpolation subject pixel that has been set by the unit 103e for setting interpolation subject pixel and has the highest interpolation accuracy among the calculation methods of interpolated value that have been supplied from the unit 103b for supplying calculated method of interpolated value. Furthermore, it is arranged for the unit 103f for interpolating defective pixel to generate an interpolated pixel value at the interpolation subject pixel by using that optimum calculation method of interpolated value that has been selected by the unit 103d for selecting optimum calculation method of interpolated value. Due to this, in the interpolation of the defective pixel image data, it is possible to improve the accuracy at which the fine structure is reproduced, while also being able to enhance the accuracy of false color suppression.

(2) For each of the calculation methods of interpolated value, the unit 103b for supplying calculation method of interpolated value supplies relative position information for the reference pixels for interpolation with respect to the interpolation subject pixels to the unit 103d for selecting optimum calculation method of interpolated value. The unit 103d for selecting optimum calculation method of interpolated value obtains the positions of the reference pixels for interpolation within the image data, on the basis of the positions of the interpolation subject pixels within the image data and the relative position information for the reference pixels for interpolation within the image data. Then it is arranged for the unit 103d for selecting optimum calculation method of interpolated value to decide whether or not a reference pixel for interpolation is a defective pixel, on the basis of the position of this reference pixel for interpolation within the image data and the defective pixel position information within the image data; and to decide whether this calculation method of interpolated value can be applied if it has decided that this the reference pixel for interpolation is not a defective pixel. By doing this, it is possible to enhance the accuracy of the interpolation, since it is possible to perform the interpolation by referring only to pixels that are normal.

(3) It is arranged for the unit 103*d* for selecting optimum calculation method of interpolated value to decide whether the various proposed calculation methods of interpolated value can be applied, in the descending order of their interpolation accuracy, and to select, as the optimum auxiliary calculation method of interpolated value, the first one thereof that it has decided can be applied. Due to this, it is possible to interpolate the defective pixels while using the calculation method of interpolated value that has the highest accuracy.

(4) It is arranged for the unit 103*a* for deciding similarity direction to decide upon the similarity direction of the structure of the image in the neighborhood of the interpolation subject pixel, and for the unit 103*b* for supplying calculation method of interpolated value to supply a plurality of calculation methods of interpolated value, on the basis of the similarity direction that has been decided upon by the unit 103*a* for deciding similarity direction. Due to this it becomes possible to perform interpolation at high accuracy, by using the pixel values of pixels that are arranged in along the similarity direction with the interpolation subject pixels.

Embodiment Two

In a second embodiment, the unit 103*d* for selecting optimum calculation method of interpolated value interpolates the relative position (p,q) of interpolation subject pixels using those pixels that are of the same color as the relative position (p,q) of interpolation subject pixels among the pixels around this relative position (p,q) of interpolation subject pixels. Thereafter, the unit 103*d* for selecting optimum calculation method of interpolated value interpolates the relative position (p,q) of interpolation subject pixels using those pixels that are of a different color from the relative position (p,q) of interpolation subject pixels among the pixels around this relative position (p,q) of interpolation subject pixels. The unit 103*b* for supplying calculation method of interpolated value outputs calculation methods of interpolated value that may be used for this to the unit 103*d* for selecting optimum calculation method of interpolated value.

In this second embodiment, it should be understood that since the figures would be similar to FIGS. 1 through 3 for the first embodiment, explanation thereof will be omitted. Moreover since the processing performed by the unit 103*a* for deciding similarity direction, the unit 103*c* for recording position information of defective pixel, and the unit 103*e* for setting interpolation subject pixel among the various units 103*a* through 103*f* shown in FIG. 2 is similar to that in the first embodiment, explanation thereof will also be omitted.

The unit 103*b* for supplying calculation method of interpolated value outputs a plurality of calculation methods of interpolated value to the unit 103*d* for selecting optimum calculation method of interpolated value according to the similarity direction decided upon by the unit 103*a* for deciding similarity direction. For example, if the decision result for the similarity direction made by the unit 103*a* for deciding similarity direction is the horizontal direction, the unit 103*b* for supplying calculation method of interpolated value outputs the following reference calculation methods #1 through #3 of interpolated value, and the following auxiliary calculation methods of interpolated value that correspond to these reference calculation methods of interpolated value to the unit 103*d* for optimum calculation method of interpolated value.

Reference calculation method #1 of interpolated value: n=2, X={-2, 2}, Y={0, 0}, K={2, 2}.

Auxiliary calculation method #1 of interpolated value corresponding to the reference calculation method #1 of interpolated value: n=4, X={-3, -1, 1, 3}, Y={0, 0, 0, 0}, K={-1, 1, 1, -1}.

Auxiliary calculation method #2 of interpolated value corresponding to the reference calculation method #1 of interpolated value: n=2, X={-3, -1}, Y={0, 0}, K={-1, 1}.

Auxiliary calculation method #3 of interpolated value corresponding to the reference calculation method #1 of interpolated value: n=2, X={1, 3}, Y={0, 0}, K={1, -1}.

Auxiliary calculation method #4 of interpolated value corresponding to the reference calculation method #1 of interpolated value: n=0, X={ }, Y={ }, K={ }.

Reference calculation method #2 of interpolated value: n=1, X={-2}, Y={0}, K={2}.

Auxiliary calculation method #1 of interpolated value corresponding to the reference calculation method #2 of interpolated value: n=2, X={-3, -1}, Y={0, 0}, K={-1, 1}.

Auxiliary calculation method #2 of interpolated value corresponding to the reference calculation method #2 of interpolated value: n=0, X={ }, Y={ }, K={ }.

Reference calculation method #3 of interpolated value: n=1, X={-2}, Y={0}, K={2}.

Auxiliary calculation method #1 of interpolated value corresponding to the reference calculation method #3 of interpolated value: n=2, X={1, 3}, Y={0, 0}, K={1, -1}.

Auxiliary calculation method #2 of interpolated value corresponding to the reference calculation method #3 of interpolated value: n=0, X={ }, Y={ }, K={ }.

The unit 103*d* for selecting optimum calculation method of interpolated value acquires the reference calculation methods #1 through #3 of interpolated value that have been input from the unit 103*b* for supplying calculation method of interpolated value, and the respectively corresponding auxiliary calculation methods of interpolated value that respectively correspond to these reference calculation methods of interpolated value. And the unit 103*d* for selecting optimum calculation method of interpolated value acquires the defect map D(i,j) and the relative positions (p,q) of the interpolation subject pixels that have been input from the unit 103*e* for setting interpolation subject pixel.

In a similar manner to the first embodiment described above, the unit 103*d* for selecting optimum calculation method of interpolated value makes decisions as to whether it is possible to apply any of the reference calculation methods from #1 of interpolated value in order to the relative positions (p,q) of the interpolation subject pixels, and selects the first such reference method for which the result of making the decision described above is applicable, as the optimum reference calculation method of interpolated value. Next, the unit 103*d* for selecting optimum calculation method of interpolation value makes decisions as to whether it is possible to apply any of the auxiliary calculation methods of interpolated value that correspond to this optimum reference calculation method of interpolated value, from #1 onwards in order, and selects the first such auxiliary method for which the result of making the decision described above is applicable, as the optimum auxiliary calculation method of interpolated value.

And the unit 103*d* for selecting optimum calculation method of interpolated value outputs, to the unit 103*f* for interpolating defective pixel, the relative positions (p,q) of interpolation subject pixels, and the optimum reference calculation method of interpolated value and the optimum auxiliary calculation method of interpolated value for interpolating the relative positions (p,q) of interpolation subject pixels.

The unit 103*f* for interpolating defective pixel acquires the relative positions (p,q) of interpolation subject pixels input from the unit 103*d* for selecting optimum calculation method of interpolated value, and the optimum reference calculation method of interpolated value and the optimum auxiliary calculation method of interpolated value for interpolating it. And the unit 103*f* for interpolating defective pixel reads in the defective clump position (P,Q) described above from the unit 103*c* for recording position information of defective pixel.

And, first, using the parameters n, X, Y, and K of the optimum reference calculation method of interpolated value for the relative positions (p,q) of interpolation subject pixels, the unit 103*f* for interpolating defective pixel generates a reference interpolated value for the defective pixel A(P+p,Q+q) according to the following Equation (7):

Equation #7

$$A(P+p, Q+q) = \frac{1}{4}\sum_{i=0}^{n-1}(K[i] \times A(P+p+X[i], Q+q+Y[i])) \quad (7)$$

Next, using the parameters n, X, Y, and K of the optimum auxiliary calculation method of interpolated value, the unit 103*f* for interpolating defective pixel adds an auxiliary interpolated value to the defective pixel A (P+p,Q+q) according to the following Equation (8):

Equation #8

$$A(P+p, Q+q) \mathrel{+}= \frac{1}{4}\sum_{i=0}^{n-1}(K[i] \times A(P+p+X[i], Q+q+Y[i])) \quad (8)$$

According to the second embodiment as explained above, in additional to the beneficial operational effects with the first embodiment, the following advantageous effect may be obtained. That is, it is arranged to perform the calculation by dividing the optimum calculation method of interpolated value into the optimum reference calculation method of interpolated value and the optimum auxiliary calculation method of interpolated value, and to generate the interpolated defective pixel A(P+p,Q+q) using these. As a result, it is possible to obtain the advantageous effects of being able to economize upon the amount of memory for recording the calculation methods of interpolated value and to economize upon the amount of calculation for optimum interpolated value selection.

Furthermore, according to the second embodiment, it is possible to add a correction to the auxiliary interpolated value, since the calculation distinguishes between the auxiliary interpolated value and the reference interpolated value. For example, it would be acceptable to arrange to perform clipping processing so that the auxiliary interpolated value does not become too large. In concrete terms, it would be acceptable to impose a limit, so that the absolute value of the auxiliary interpolated value stays within around one eighth of the general level of the pixel values. The following advantageous effects may be obtained by this type of processing.

If the color component of the auxiliary interpolated value is large with respect to the magnitude of the color component of the reference interpolated value at the spot where defect correction is performed, sometimes it happens that the magnitude of a high frequency component that is calculated as the auxiliary interpolated value becomes greater than the actual high frequency component of the color component of the reference interpolated value, so that some inappropriate structure is added. Accordingly, if the auxiliary interpolated value becomes a large value, it is not desirable to add this just as it without any change to the reference interpolated value, but rather it is desirable to limit the magnitude of the auxiliary interpolated value that is added on, as in the processing described above. It should be understood that, instead of limiting the absolute value of the auxiliary interpolated value to stay within around one eighth of the general level of the pixel value, it would also be acceptable to arrange to limit it to, for example, to stay within a value of around one half of the reference interpolated value.

Variant Embodiments

It should be understood that the digital camera of the embodiments described above may also be varied in the following ways.

(1) In the first embodiment described above, an example was explained in which, if for example the result of the decision by the unit 103*a* for deciding similarity direction is the horizontal direction, the unit 103*b* for supplying calculation method of interpolated value outputs the eight calculation methods of interpolated value, from the calculation method #1 of interpolated value to the calculation method #8 of interpolated value, to the unit 103*d* for selecting optimum calculation method of interpolated value. Furthermore, in the second embodiment described above, an example was explained in which, if for example the result of the decision by the unit 103*a* for deciding similarity direction is the horizontal direction, the unit 103*b* for supplying calculation method of interpolated value outputs the reference calculation methods #1 of interpolated value through #3, and the auxiliary calculation methods of interpolated value that correspond to these reference calculation methods of interpolated value, to the unit 103*d* for selecting optimum calculation method of interpolated value. However, the calculation method of interpolated value that is output by the unit 103*b* for supplying calculation method of interpolated value is not to be considered as being limited to being one of these methods described above; it would also be possible to apply calculation methods of interpolated value of various per se known types.

(2) In the first and second embodiments described above, examples have been explained in which the correction processing for defective pixels has been applied to a digital camera 100. However, the present invention could also be applied to performing processing upon an image processing apparatus of any type, provided that it is equipped with an imaging element; for example, the present invention could be applied to a portable telephone with incorporated camera, or to a video camera or the like.

The above described embodiments are examples, and various modifications can be made without departing from the scope of the invention.

What is claimed is:

1. An image processing apparatus, comprising:
a storage unit that records position information for a defective pixel;
a setting unit that sets the defective pixel as an interpolation subject pixel, based on the recorded position information;
a selection unit that selects an optimum calculation equation for an interpolated value from among a plurality of calculation equations for an interpolated value to interpolate a pixel value of the interpolation subject pixel; and
an interpolation unit that interpolates the pixel value of the interpolation subject pixel by using the optimum calculation equation for an interpolated value selected by the selection unit, wherein
the selection unit decides whether each of the plurality of calculation equations for an interpolated value can be applied to the interpolation subject pixel, based on the position information recorded in the storage unit; and the optimum calculation equation for an interpolated value is one of the plurality of calculation equations for an interpolated value that can be applied to the interpolation subject pixel, and uses a largest number of reference pixels for an interpolated value among the plurality of calculation equations that are decided to be possible to be applied to the interpolation subject pixel.

2. An image processing apparatus according to claim 1, further comprising:
a similarity direction decision unit that decides upon a similarity direction of an image structure in a neighborhood of the interpolation subject pixel, wherein
the selection unit selects the optimum calculation equations for an interpolated value from among the plurality of calculation equations for an interpolated value, according to the similarity direction from the similarity direction decision unit.

3. An image processing apparatus, comprising:
a storage unit that records position information for a defective pixel;
a setting unit that sets the defective pixel as an interpolation subject pixel, based on the recorded position information;
a selection unit that selects an optimum calculation equation for an interpolated value from among a plurality of calculation equations for an interpolated value to interpolate a pixel value of the interpolation subject pixel; and
an interpolation unit that interpolates the pixel value of the interpolation subject pixel by using the optimum calculation equation for an interpolated value selected by the selection unit, wherein
the plurality of calculation equations for an interpolated value use pixel values of a plurality of reference pixels for interpolation that are arranged around the interpolation subject pixel;
each of the plurality of calculation equations for an interpolated value has a mutually different combination of pixel values of the plurality of reference pixels for interpolation that are used, and has mutually different interpolation accuracies;
the selection unit is configured to:
decide that each calculation equation of the plurality of calculation equations for an interpolated value can be applied to the interpolation subject pixel, if the plurality of reference pixels for interpolation used by the calculation equation for an interpolated value do not include any defective pixel except for the interpolation subject pixel; and
select the calculation equation for an interpolated value where a number of used reference pixels is the largest among the plurality of calculation equations for an interpolated value decided as being applicable, as the optimum calculation equation for an interpolated value.

4. An image processing apparatus according to claim 3, wherein:
the selection unit is configured to:
calculate a position of the reference pixel for interpolation in an image data, based on a position of the interpolation subject pixel in the image data and a relative position information of the reference pixel for interpolation with respect to the interpolation subject pixel;
decide whether the reference pixel for interpolation is a defective pixel, based on the position of the reference pixel for interpolation in the image data and a position information of the defective pixel; and
decide that the calculation equation for an interpolated value can be applied to the interpolation subject pixel, if the reference pixel for interpolation is decided as not being a defective pixel.

5. An image processing apparatus, comprising:
a storage unit that records position information for a defective pixel;
a setting unit that sets the defective pixel as an interpolation subject pixel, based on the recorded position information;
a selection unit that selects an optimum calculation equation for an interpolated value from among a plurality of calculation equations for an interpolated value to interpolate a pixel value of the interpolation subject pixel; and
an interpolation unit that interpolates the pixel value of the interpolation subject pixel by using the optimum calculation equation for an interpolated value selected by the selection unit, wherein
the optimum calculation equation for an interpolated value is one of the plurality of calculation equations for an interpolated value that can be applied to the interpolation subject pixel, and uses a largest number of reference pixels for an interpolated value among the plurality of calculation equations that can be applied to the interpolation subject pixel, and
the selection unit is configured to:
decide whether each of the plurality of calculation equations for an interpolated value can be applied to the interpolation subject pixel, in descending order of a number of used reference pixels; and
select the calculation equation for an interpolated value that is first decided as being applicable, as the optimum calculation equation for an interpolated value.

6. An image processing apparatus, comprising:
a storage unit that records position information for a defective pixel;
a setting unit that sets the defective pixel as an interpolation subject pixel, based on the recorded position information;
a selection unit that selects an optimum calculation equation for an interpolated value from among a plurality of calculation equations for an interpolated value to interpolate a pixel value of the interpolation subject pixel; and
an interpolation unit that interpolates the pixel value of the interpolation subject pixel by using the optimum calculation equation for an interpolated value selected by the selection unit, wherein
the plurality of calculation equations for an interpolated value includes a reference calculation equation for an interpolated value and an auxiliary calculation equation for an interpolated value;
the selection unit, after having selected an optimum reference calculation equation for an interpolated value from among a plurality of reference calculation equations for an interpolated value, selects an optimum auxiliary calculation equation for an interpolated value from among a plurality of auxiliary calculation equations for an interpolated value corresponding to the selected optimum reference calculation equation for an interpolated value;
the interpolation unit performs interpolation so that a value obtained by adding together a reference interpolated value and an auxiliary interpolated value becomes the pixel value for the interpolation subject pixel, the reference interpolated value being calculated by using the optimum reference calculation equation for an interpolated value and the auxiliary interpolated value being calculated by using the optimum auxiliary calculation equation for an interpolated value;

the optimum reference calculation equation for an interpolated value is one of the plurality of reference calculation equations for an interpolated value that can be applied to the interpolation subject pixel, and has a highest interpolation accuracy of the plurality of reference calculation equations for an interpolated value; and the optimum auxiliary calculation equation for an interpolated value is one of the plurality of auxiliary calculation equations for an interpolated value that can be applied to the interpolation subject pixel, and has a highest interpolation accuracy of the plurality of auxiliary calculation equations for an interpolated value.

7. An image processing apparatus according to claim 6, wherein:

the selection unit is configured to:

decide whether each of the plurality of reference calculation equations for an interpolated value can be applied to the interpolation subject pixel, in descending order of interpolation accuracy; and select an reference calculation equation for an interpolated value that is first decided as being applicable, as the optimum reference calculation equation for an interpolated value.

8. An image processing apparatus according to claim 6, wherein:

the selection unit is configured to:

decide whether each of the plurality of auxiliary calculation equations for an interpolated value can be applied to the interpolation subject pixel, in descending order of interpolation accuracy; and select an auxiliary calculation equation for an interpolated value that is first decided as being applicable, as the optimum auxiliary calculation equation for an interpolated value.

9. An imaging apparatus, comprising:

an image sensor that captures an image of a photographic subject; and an image processing apparatus according to claim 1, that creates image data by performing image processing upon an image signal output from the image sensor, wherein the image processing apparatus creates the image data by interpolating a pixel value of a defective pixel included in the image sensor by using the image signal that is output from the image sensor.

* * * * *